United States Patent [19]

Lang

[11] Patent Number: 4,842,085
[45] Date of Patent: Jun. 27, 1989

[54] MULTIPLE RANGE ELECTRONIC WEIGH SCALE

[75] Inventor: David A. Lang, Novi, Mich.

[73] Assignee: GSE, Incorporated, Farmington Hills, Mich.

[21] Appl. No.: 174,199

[22] Filed: Mar. 28, 1988

[51] Int. Cl.[4] .......................... G01G 23/14; G01G 3/14
[52] U.S. Cl. ...................................... 177/164; 177/211
[58] Field of Search .......................... 177/50, 164, 211

[56] References Cited

U.S. PATENT DOCUMENTS

| | | |
|---|---|---|
| 4,143,724 | 3/1979 | Itani . |
| 4,158,396 | 6/1979 | Suzuki et al. . |
| 4,330,837 | 5/1982 | Itani . |
| 4,375,243 | 3/1983 | Doll . |
| 4,630,696 | 12/1986 | Kemnitz . |
| 4,690,230 | 9/1987 | Uchimura et al. . |
| 4,696,359 | 9/1987 | Glibbery ............................ 177/211 |
| 4,706,767 | 11/1987 | Chou ................................ 177/164 X |

Primary Examiner—George H. Miller, Jr.
Attorney, Agent, or Firm—Krass & Young

[57] ABSTRACT

The present invention is a multiple range electronic weigh scale which employs a single load cell and selectable amplifier gain. A more sensitive range would employ a higher gain amplification than a less sensitive range. In accordance with the preferred embodiment, the amplified load cell signal is applied to an analog to digital converter and the digital output is applied to a microprocessor. The microprocessor enables selection between the weight ranges based upon the relationship of the digital output to upper and lower limit values. The microprocessor also generates the output weight signal for display based upon the product of the digital output and the selected gain. In a further embodiment the microprocessor generates a digital offset signal which is applied to the inverting input of a differential amplified via a digital to analog converter. This permits the starting point of the most sensitive range of the electronic weigh scale to be adjusted to any desired point in the higher range.

11 Claims, 6 Drawing Sheets

MULTIPLE RANGE ELECTRONIC WEIGH SCALE

TECHNICAL FIELD OF THE INVENTION

The technical field of the present invention is that of electronic weigh scales, and in particular such electronic weigh scales which provide multiple range indications of weight.

BACKGROUND OF THE INVENTION

Electronic weigh scales generating digital outputs are known in the art. It is typical in such an electronic weigh scale to employ a load cell which generates an analog weight signal proportional to the weight of the object to be weighed. This analog weight signal is amplified via an analog amplifier and then applied to an analog to digital converter. The digital weight signal proportional to the analog weight signal is then applied to a computing device which may be in the form of a microprocessor. This computing device then converts the raw digital number into a weight which may be indicated in metric or English form.

The use of a computer operating upon the digital weight enables the electronic weigh scale to be advantageously employed in a number of ways. In particular, it is relatively simple to indicate a tare weight and subtract that from the gross weight in order to obtain the net weight. For example, the container alone can be placed upon the platform of the electronic weigh scale and the tare weight measured and stored. The scale can then be zeroed by subtracting the tare weight from the total weight. Thus, after the addition of the contents of the container, the resulting weight is the net weight rather than the gross weight. Such a scale can also be employed as a counting device of objects of identical weight. This is achieved by weighing one or more of the objects to be counted and computing the average weight. Then a quantity of the objects to be counted is introduced onto the weighing platform. The total weight is divided by the previously computed average weight in order to obtain the count of the number of objects on the weigh platform.

In addition to the usefulness of being able to digitally manipulate the weight or weights of objects in the computing device, it would also be advantageous to provide a plurality of weight ranges in such an electronic weigh scale. A multiple range function would enable the same apparatus to provide weights having differing full scale ranges based upon the differing sensitivity. Heretofore, such multiple range electronic weigh apparatuses have employed either multiple load cells or analog range switching.

A multiple range electronic weigh scale employing multiple load cells typically provides outputs of differing sensitivity to the same weight upon the weigh platform. The multiple load cells of such a multiple range electronic weigh scale in accordance with this teaching of the prior art are generally disposed in tandem so that the most sensitive load cell is first actuated followed by successive actuation of load cells having decreasing sensitivity. An example of such an electronic weigh scale is U.S. Pat. No. 4,690,230 entitled "Multi-Range Load Cell Weighing Instrument," issued to Uchimura et al. on Sept. 1, 1987. Such multiple range electronic weigh scales typically involve complex mechanical configurations in order to enable the cooperation of the load cells of differing sensitivity. Accordingly, it would be advantageous in the art to provide a multiple range electronic weigh apparatus which provides the multiple range capability primarily in the electronics of the apparatus. Because the electronics can typically be configured in a much wider range of flexible configurations than the mechanical parts of such an electronic weigh scale, it is considered advantageous to employ a preexisting load cell with new electronic circuits in order to provide a desired multiple range capability.

Also known in the prior art is a multiple range electronic weigh scale employing analog switching between weight ranges. U.S. Pat. No. 4,696,359 entitled "Electronic Weighing Apparatus," issued to Glibbery on Sept. 29, 1987 describes such a system. The analog signal from a single load cell, after preliminary signal conditioning and amplification, is applied to a voltage comparator. This voltage comparator compares this analog signal to a preset voltage corresponding to the weight range boundary. The voltage comparator output controls the gain of an amplifier which receives the analog signal as an input and drives an analog to digital converter. When the analog signal is below the preset voltage a higher gain is selected. When the analog signal is above the preset voltage a lower gain is selected. This technique lacks the flexibility provided by the use of a digital computing device to manipulate the weight or weights. In particular the provision of more than two ranges according to the technique of U.S. Pat. No. 4,696,359 would require additional voltage comparator circuits.

SUMMARY OF THE INVENTION

The present invention is a multiple range electronic weigh scale employing a single load cell. The analog output of this single load cell, which is proportional to the weight of the object or objects to be weighed, is applied to a selectable gain amplifier. The gain of this selectable gain amplifier is selected from one of a set of predetermined gains. The particular gain selected is dependent upon the electrical weight signal from the load cell, that is, dependent upon the magnitude of the weight measured by the load cell. The gain is selected to provide the most sensitive range which includes the weight of the object or objects to be weighed. The output of the selectable gain amplifier is employed to generate an indication of the weight which is proportional to the amplified weight signal and the selected gain.

In accordance with the preferred embodiment of the present invention the selectable gain amplifier includes a plurality of fixed gain amplifiers. Each fixed gain amplifier has a fixed gain corresponding to one of the set of predetermined gains. The output of each of these fixed gain amplifiers is connected to a switch selection device which selects the output from the fixed gain amplifier having the selected gain. Also in accordance with the preferred embodiment of the present invention the electronic weigh scale generates an indication of the particular selected gain and thus the particular range currently employed.

In the preferred embodiment of the present invention the output of the selectable gain amplifier is applied to an analog to digital converter. The digital output of this analog to digital converter, which is proportional to the amplified weight signal applied to its analog input, is applied to a microprocessor. This microprocessor compares the digital weight signal with an upper limit value and a lower limit value. The microprocessor selects the next lower gain of the set of predetermined gains if the digital weight signal is greater than the upper limit value and selects the next higher gain if the digital weight signal is less than the lower limit value. The microprocessor generates the output weight signal which corresponds to the digital weight signal and the selected gain.

In the preferred embodiment of the present invention, the upper limit value is greater than the lower limit value. This permits the provision of hysteresis function in the range selection. In the range between the lower limit value and the upper limit value the range selected would depend upon the prior measured weight. This provision of a hysteresis function would prevent uncontrolled switching between adjacent weight ranges when the measured weight is very near the boundary between the weight ranges.

Also in accordance with the preferred embodiment of this invention, the microprocessor generates an overrange signal if the digital weight signal is greater than the upper digital limit value and the highest range is selected. The microprocessor further controls the display device of the electronic weigh scale to indicate this overrange condition.

In accordance with a further aspect of the present invention, the multiple range electronic weigh scale includes an offsetting function which serves to adjust the maximum sensitivity scale to any desired portion of the range of the least sensitive scale. In accordance with the preferred embodiment of the present invention, this is achieved by the generation of an offset signal which is applied to a differential amplifier for amplifying the analog weight signal by a low gain or for amplifying the difference between the weight signal and an offset signal by a high gain. This offset signal is selected to begin the sensitive range at a particular weight within the range of the least sensitive scale. The output is indicated according to the magnitude of the analog weight signal and the low gain if the high range has been selected. In the case in which the low range has been selected the output is equal to the sum of the weight corresponding to the offset signal and the difference between the weight corresponding to the offset signal and the magnitude of the amplified weight signal. In accordance with the preferred embodiment of the present invention, the offset can be set via a manual input. This could be either at the current weight indicated by the high range scale or at a weight which is entered via a plurality of digits via a manual keyboard.

In accordance with the preferred embodiment of the present invention, the control processes and this moving range electronic weight scale is performed by a microprocessor. In particular, the microprocessor generates a digital offset weight signal which is applied to a digital to analog converter. The analog signal corresponding to this digital offset weight is applied to the inverting input of a differential amplifier. The non-inverting input of this differential amplifier receives the analog weight signal from the load cell. The differential amplifier thus amplifies the difference between the offset weight and the output of the load cell. This, therefore, provides the signal corresponding to the expanded range.

BRIEF DESCRIPTION OF THE DRAWINGS

These and other objects and aspects of the present invention will become clear in conjunction with the foregoing description and the drawings in which.

DETAILED DESCRIPTION OF THE PREFERRED EMBODIMENTS

Figure 1:
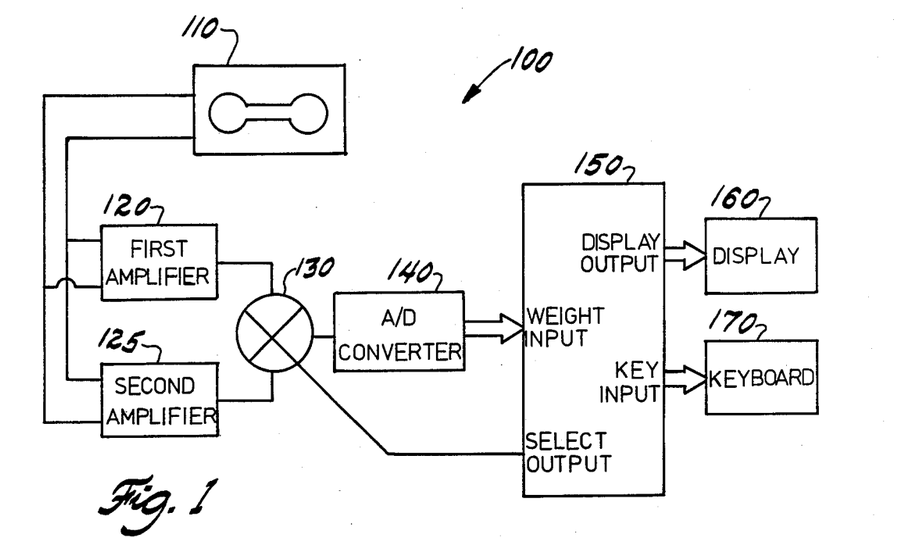
FIG. 1 illustrates a schematic diagram of the circuit of a dual range electronic weigh scale in accordance with a first embodiment of the present invention.
Figure 2:
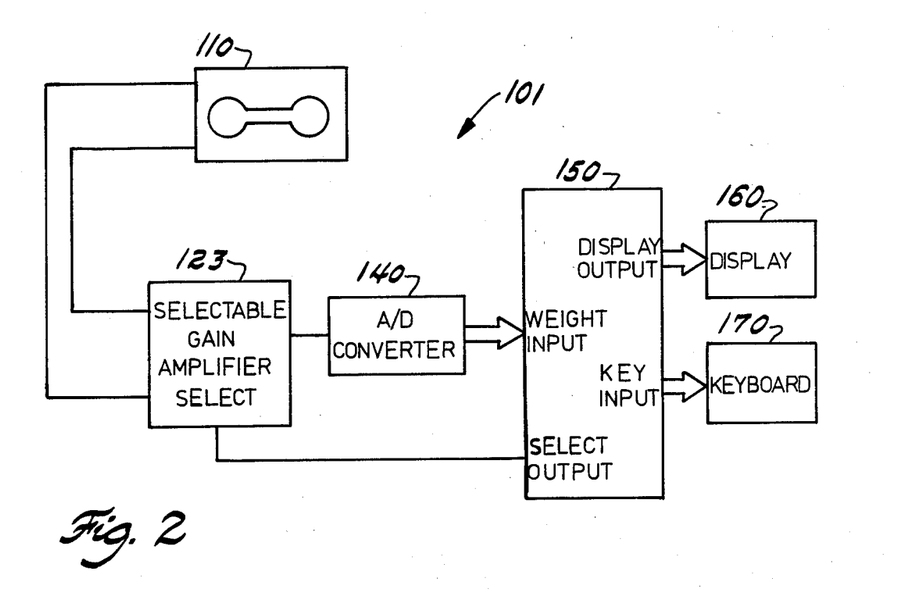
FIG. 2 illustrates an alternative embodiment of a multiple range electronic weigh scale in accordance with the present invention.

FIGS. 1 and 2 illustrate alternative embodiments of the multiple range electronic weigh scale in accordance with the present invention. FIG. 1 illustrates employing separate fixed gain amplifiers. FIG. 2 illustrates employing a single selectable gain amplifier.

FIG. 1 is a schematic diagram illustrating the electronic weigh scale apparatus in accordance with a first embodiment of the present invention. Electronic weigh scale 100 includes load cell 110. Load cell 110 is of conventional construction. In accordance with the prior art load cell 110 generates an analog electrical signal proportional to the weight on the weigh platform (not illustrated). It is typical to employ a Wheatstone bridge of flexible resistors. Weight placed upon the weigh platform causes a twisting in load cell 110 causing differential deformation of these resistors. This causes small changes in the resistance of the resistors of the Wheatstone bridge. This creates a differential voltage across the output terminals. In a typical load cell of this type having a full scale range of approximately 20 pounds the output is approximately 14.5 millivolts at full scale. Due to this relatively low output voltage the output of load cell 110 is typically amplified prior to any other processing. In accordance with the prior art this amplification factor is typically about 100, yielding a full scale output voltage of approximately 1.45 volts.

FIG. 1 illustrates the output of load cell 110 applied jointly to the inputs of first amplifier 120 and second amplifier 125. First amplifier 120 includes a gain of approximately 100, in accordance with the prior art. Second amplifier 125 employs a higher gain, in accordance with the preferred embodiment a gain of 1000. This gain is ten times greater than the gain of first amplifier 120. This ratio of gains between first amplifier 120 and second amplifier 125 causes the output of second amplifier 125 to be ten times more sensitive than the output of first amplifier 120.

The output of first amplifier 120 and second amplifier 125 are each applied to switch device 130. According to the select output generated by microprocessor 150, either the output of first amplifier 120 or the output of second amplifier 125 is selected. This output is applied to the input of analog to digital converter 140. Analog to digital converter 140 converts the analog input into a digital number corresponding to this analog input. This digital number is applied to microprocessor 150 via a weight input. Analog to digital converter 140 is typically designed to have a greater voltage range than the voltage at the nominal full range. This permits a slight overrange voltage to be accurately converted into a digital number by analog to digital converter 140. This excess over the nominal full range is typically 120% to 125%.

Microprocessor 150 performs the major processing and control functions of electronic weigh scale 100. Microprocessor 150 receives the weight input from analog to digital converter 140. This weight input is a digital number corresponding to the analog output of the selected first amplifier 120 or second amplifier 125. Microprocessor 150 includes a select output which is applied to switch device 130 to select either first amplifier 120 or second amplifier 125. Microprocessor 150 is connected via a display output to a display 160. This display is typically a light emitting diode or liquid crystal display. Also connected to microprocessor 150 via a key input is keyboard 170. Keyboard 170 typically includes individual input keys for selection of the mode of operation of electronic weigh scale 100 and may include a set of digits and a decimal point to enter numbers into microprocessor 150. Microprocessor 150 is typically a programmed microprocessor device. Microprocessor 150 is programmed in a manner known in the art to provide the input, display control, and processing functions of electronic weigh scale 100.

In operation, electronic weigh scale 100 generates an output via display 160 corresponding to the weight of the object to be weighed on the weigh platform (not shown). Microprocessor 150 determines which of the signals applied to switch device 130 is coupled to analog to digital converter 140. In accordance with the preferred embodiment of the present invention, microprocessor 150 compares the digital output applied to the weight input with a set of upper and lower limit values. In accordance with the relationship between the digital weight input and these upper and lower digital limits, microprocessor 150 may change the selection of amplifier via switch device 130. This change of the selection of switch device 130 provides a change of range of sensitivity for the electronic weigh scale 100. Microprocessor 150 converts the digital weigh signal input into a particular weight output signal corresponding to its magnitude and the magnitude of the selected gain. In accordance with the preferred embodiment of the present invention, this output may be calibrated in either English units (pounds) or in metric units (kilograms).

FIG. 2 illustrates an alternative embodiment of the electronic weigh scale illustrated in FIG. 1. Electronic weigh scale 101 illustrated in FIG. 2 includes load cell 110. The output of load cell 110 is applied to a selectable gain amplifier 123. The output of selectable gain amplifier 123 is applied to analog to digital converter 140. Analog to digital converter 140 converts the analog output from selectable gain amplifier 123 into a digital number for application to the weight input of microprocessor 150. Microprocessor 150 includes a select output which is connected to a gain select input of selectable gain amplifier 123. In accordance with the output from microprocessor 150, the gain of selectable gain amplifier 123 is selected from among a set of predetermined gains.

Figure 3:
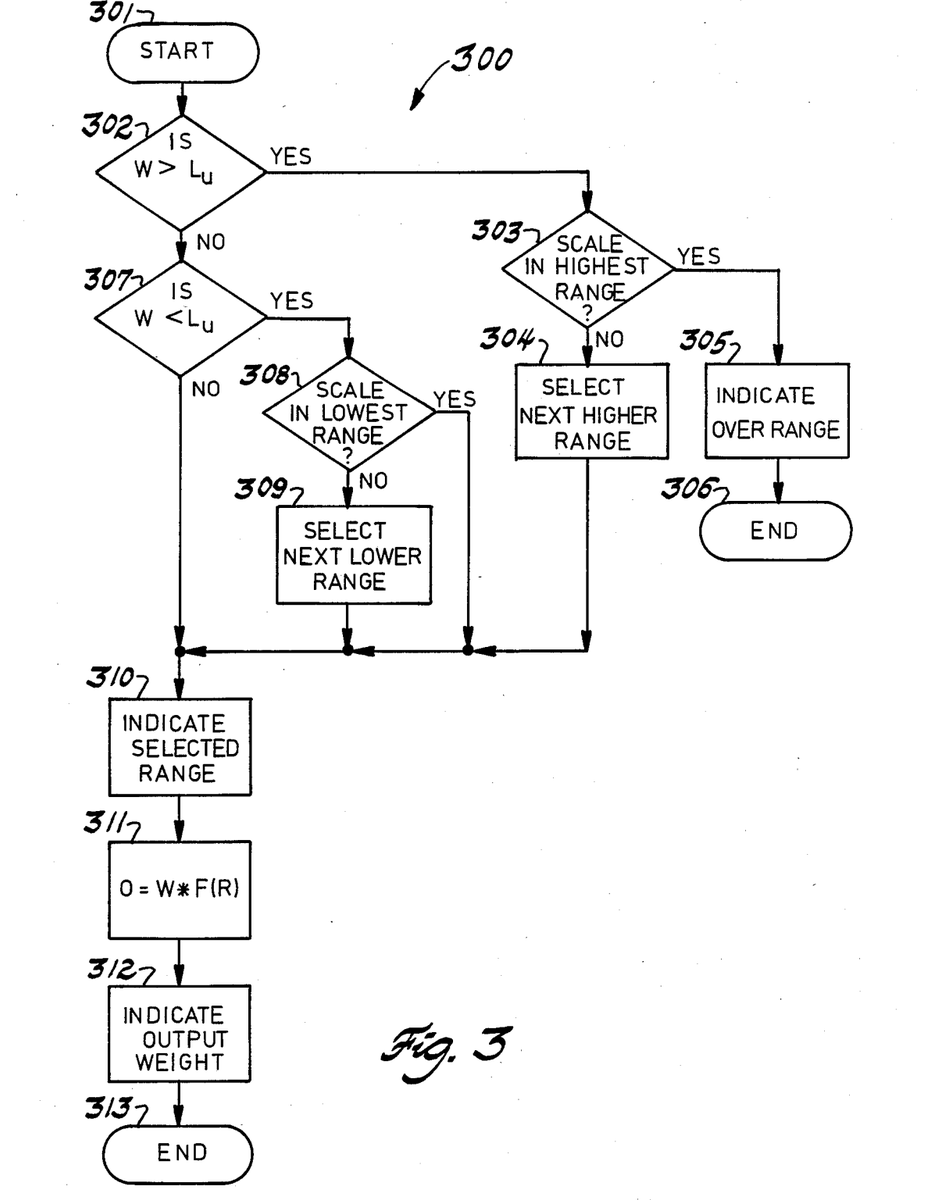
FIG. 3 illustrates a flow chart of a subroutine suitable for execution by the microprocessor illustrated in either FIGS. 1 or 2 for providing a multiple range weigh scale.

FIG. 3 illustrates a flow chart of subroutine 300, suitable for use in programming of microprocessor 150 illustrated in FIGS. 1 and 2. Subroutine 300 illustrates the control of the selection of the particular range of the multiple range electronic weigh scale and the calculation of the output weight. It should be understood that subroutine 300 illustrated in FIG. 3 is not the complete program for control of microprocessor 150. Microprocessor 150 will typically include other routines which serve to perform housekeeping functions like receiving mode inputs and the like from keyboard 170, and which provide the proper driving signals for providing the output to display 160. In addition, microprocessor 150 would typically also include routines relating to calculation of tare, net weight and gross weight and calculations of a counting function via weight by storage of an average weight per item and division of the net weight by this average weight per item. Subroutine 300 is not intended to illustrate the exact detailed steps required for programming of a microprocessor such as microprocessor 150. Rather, the flow chart illustrated in FIG. 3 is intended to provide the general overall steps necessary for practicing this invention. Those skilled in the art of programming of microprocessor devices would be enabled to provide the exact detailed program required for the particular microprocessor device selected and its corresponding instruction set from the following description of FIG. 3.

Subroutine 300 begins at start block 301. subroutine 300 first tests to determine whether or not the digital weight signal W is greater than an upper limit value $L_U$ (decision block 302). The upper limit value $L_U$ can be set to a predetermined percentage above the full scale reading of any particular range of the multiple range electronic weigh scale. For example, if the full scale weight on the highest range of the particular electronic weigh scale was twenty pounds, then the upper limit value $L_U$ could be set at 5% above this full scale weight, corresponding to a digital weight value W of about 21 pounds. This would ensure that this would reliably indicate each time that the digital weight signal W exceeds the maximum of its particular range by the predetermined percentage. Thus the upper limit value $L_U$ would be 105% of the nominal full range value.

If this condition is satisfied, then subroutine 300 next tests to determine whether or not the electronic weigh scale is currently in the highest range (decision block 303). In accordance with the present invention, the select output of microprocessor 150 can select one of a predetermined set of gain factors from either the combination of the first amplifier 120 and the second amplifier 125 or from the selectable gain amplifier 123. The gain selection having the lowest predetermined gain corresponds to the range having the highest maximum weight. In the event that the scale is not in the highest range, then subroutine 300 causes microprocessor 150 to select the next higher range (processing block 304). This is achieved by providing the proper output at the select output to control switch device 130 or selectable gain amplifier 123. In the case of the embodiment illustrated in FIG. 1, this causes switch device 130 to select the first amplifier 120. In the embodiment illustrated in FIG. 2, this causes selectable gain amplifier 123 to select the next lower of the predetermined sets of gain.

On the other hand, if the electronic weigh scale is already in the highest range, then microprocessor 150 generates an indication of an overrange condition (processing block 305). This is achieved by providing the proper display output for control of display 160 to indicate this overrange condition. In the event that such an overrange condition is detected, then subroutine 300 is ended (end block 306) and some other portion of the program for microprocessor 150 must deal with this error condition. If such an overrange condition is not detected, then the program proceeds to processing block 310.

In the event that the digital weight signal W is not greater than the upper limit value LU, then another test is performed. Subroutine 300 tests to determine whether or not the digital weight signal W is less than a lower limit value $L_L$ (decision block 307). This lower limit value $L_L$ is set in order to ensure that any time the digital weight signal W is less than this value, that it is within the full scale range of the next most sensitive weight range. For example, if two weight ranges differ by a factor of 10, that is if the weight range with the greater sensitivity goes up to 10% of the full scale range of the weight range of the lower sensitivity, then this lower limit value $L_L$ could be set at 10.0% of the full scale indication. Any time the digital weight signal W is less than this lower limit value $L_L$, then the weight is within the full scale range of the next most sensitive weight range.

If this condition is satisfied, then subroutine 300 next tests to determine whether or not the electronic weigh scale 100 is in the most sensitive weight range (decision block 308). If the weigh scale is not within its lowest sensitive range, then subroutine 300 causes selection of the next lower weight range (processing block 309). This takes place by generation of an appropriate output at the select output of microprocessor 150 for control of either the switch device 130 (FIG. 1) or control of the gain of selectable gain amplifier 123 (FIG. 2). In the case in which the electronic weigh scale is already in the lowest range, then no action is taken. In any event, control of subroutine 300 transfers to processing block 310. As previously disclosed above, the upper limit value is preferably greater than the lower limit value to permit hysteresis in the range selection. This provision of a hysteresis prevents uncontrolled switching between adjacent weight ranges when the measured weight is very near the boundary between the weight ranges.

Subroutine 300 next calls for the indication of the selected weight range (processing block 310). This selected range could have been selected in either processing block 304 or processing block 309 described above, or some previously selected and currently unchanged range. In any event, this process takes place by microprocessor 150 generating the appropriate signals at the display output for control of display 160.

Subroutine 300 next calculates the output weight corresponding to the following equation:

$$O = W * F(R)$$

where O is the output weight signal, W is the digital weight signal received from analog to digital converter 140, and F(R) is a multiplicative factor proportional to the gain corresponding to the selected weight range R. Each of the predetermined weight ranges has a predetermined factor F which is related to the corresponding gain. Subroutine 300 next indicates this output weight O (processing block 312). This process takes place by microprocessor 150 generating the appropriate signals at the display output for control of display 160 for indication of the weight. This process may also include the storage of this output weight for computations related to tare, gross weight and net weight or related to the counting function by weight. Lastly, subroutine 300 is exited via end block 313.

Figure 4:
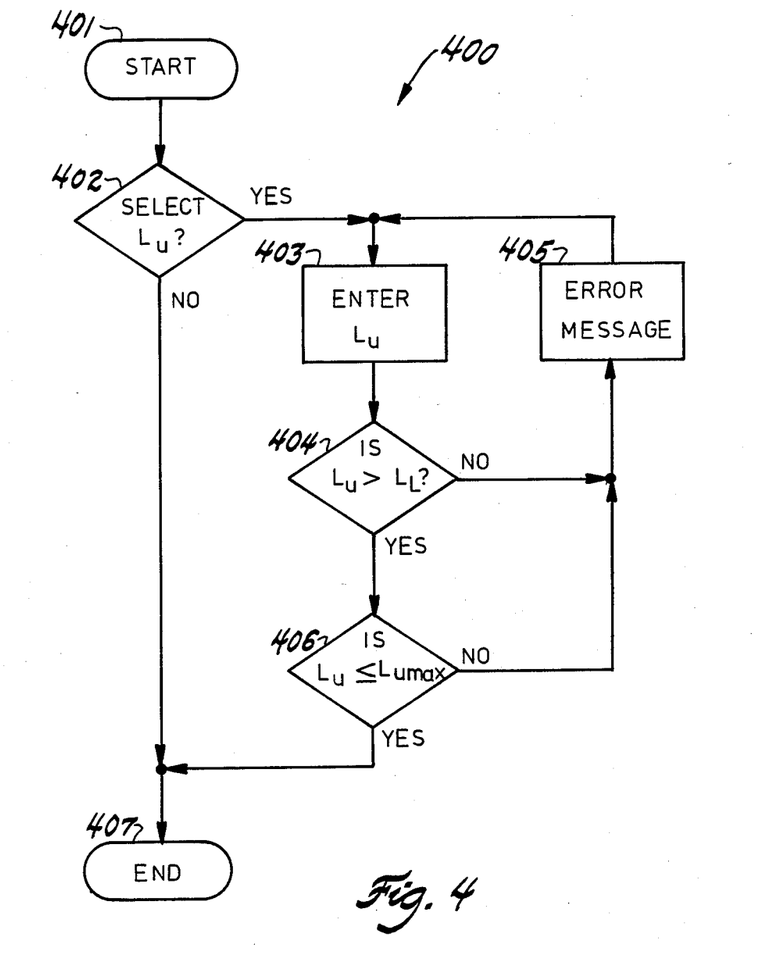
FIG. 4 illustrates a flow chart of a subroutine suitable for execution by the microprocessor illustrated in either FIGS. 1 or 2 for permitting user specification of the upper limit value.

FIG. 4 illustrates subroutine 400 for permitting the operator to enter the upper limit value $L_U$. This subroutine would typically be integrated with other subroutines of the microprocessor 150 to form the complete program. This subroutine 400 illustrated in FIG. 4 includes only those program steps relevant to this aspect of the invention. In accordance with the preferred embodiment of the invention the upper limit value $L_U$ is operator selectable while the lower limit value $L_L$ is a predetermined constant.

Subroutine 400 is entered via start block 401. Subroutine 400 first tests to determine if the user has requested specification of the upper limit value $L_U$ (decision block 402). Such a request would ordinarily be made via keyboard 170. If this is the case, then program 400 enables entry of the upper limit value $L_U$ (processing block 403). In accordance with the preferred embodiment of this invention, the specification of the value would be via digit keys included within keyboard 170.

Subroutine 400 then tests this operator specified upper limit value $L_U$ to determine if it is within allowable limits. Firstly, subroutine 400 checks to determine if the entered upper limit value $L_U$ is greater than the lower limit value $L_L$ (decision block 404). If this is not true, then an error condition exists. This error condition is signaled to the operator (processing block 405) preferably via display 160 and subroutine 400 returns to processing block 403 for reentry of the upper limit value $L_U$.

Next, subroutine 400 tests to determine if the entered upper limit value $L_U$ is less than a predetermined maximum upper limit value $L_{Umax}$ (decision block 406). This predetermined maximum upper limit value $L_{Umax}$ is set at the maximum range of the analog to digital converter 140. This test ensures that the entered upper limit value $L_U$ is within the range of analog to digital converter 140. If this is not the case, then subroutine 400 generates the error message (processing block 405) and control returns to processing block 403 for re-entry of the upper limit value $L_U$. In the event that this is true, the entered upper limit value $L_U$ is within the permitted limits. The upper limit value $L_U$ is greater than the lower limit value $L_L$, thereby permitting desirable hysteresis in the range selection. Furthermore the upper limit value $L_U$ is less than or equal to the maximum range of analog to digital converter 140. Subroutine 400 is exited via end block 407.

Figure 5:
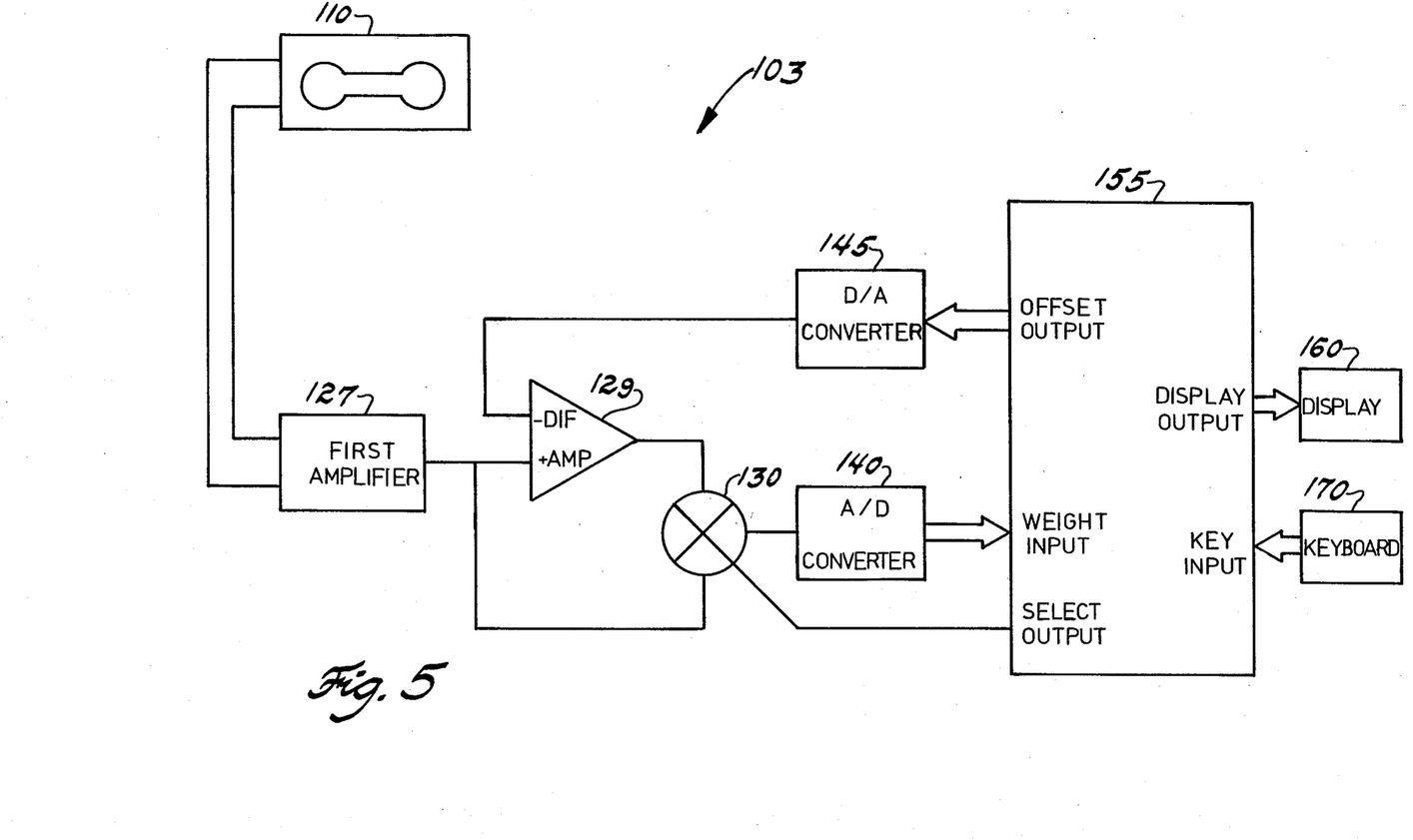
FIG. 5 illustrates the schematic diagram of an embodiment of the present invention in which the low range scale of the multiple range electronic weigh scale can be placed at any position within the high range of the electronic weigh scale.

FIG. 5 illustrates an alternative embodiment of the present invention permitting the repositioning of the zero of the more sensitive weight scale at any location within the available range of the less sensitive weight scale. Electronic weigh scale 103 illustrated in FIG. 5 includes load cell 110, of the same type as illustrated in FIGS. 1 and 2. The output of load cell 110 is applied to first amplifier 127. The amplified signal output from first amplifier 127 is applied to the non-inverting input of differential amplifier 129 and to one of the inputs of switch device 130, which is similar to switch device 130 illustrated in FIG. 1. The output of digital to analog converter 145 is applied to the inverting input of differential amplifier 129. Differential amplifier 129 has a gain greater than unity in order to provide a more sensitive range. In accordance with the preferred embodiment the gain of differential amplifier 129 is 10. Under control of the select output of microprocessor 155, switch device 130 selects either the output of first amplifier 127 or the output of differential amplifier 129 for application to the analog input to analog to digital converter 140. The digital output of analog to digital converter 140 is applied to a weight input of microprocessor 155 in the same manner as previously illustrated in FIGS. 1 and 2. Microprocessor 155 also receives a key input from keyboard 170. Microprocessor 155 generates signals at a display output for control of display 160, which is preferably formed of light emitting diodes or liquid crystal segments. In addition, microprocessor 155 generates a digital offset signal at the offset output for application to the digital input of digital to analog converter 145. This offset input is converted into an analog signal which is applied to the inverting input of differential amplifier 129.

Figure 6:
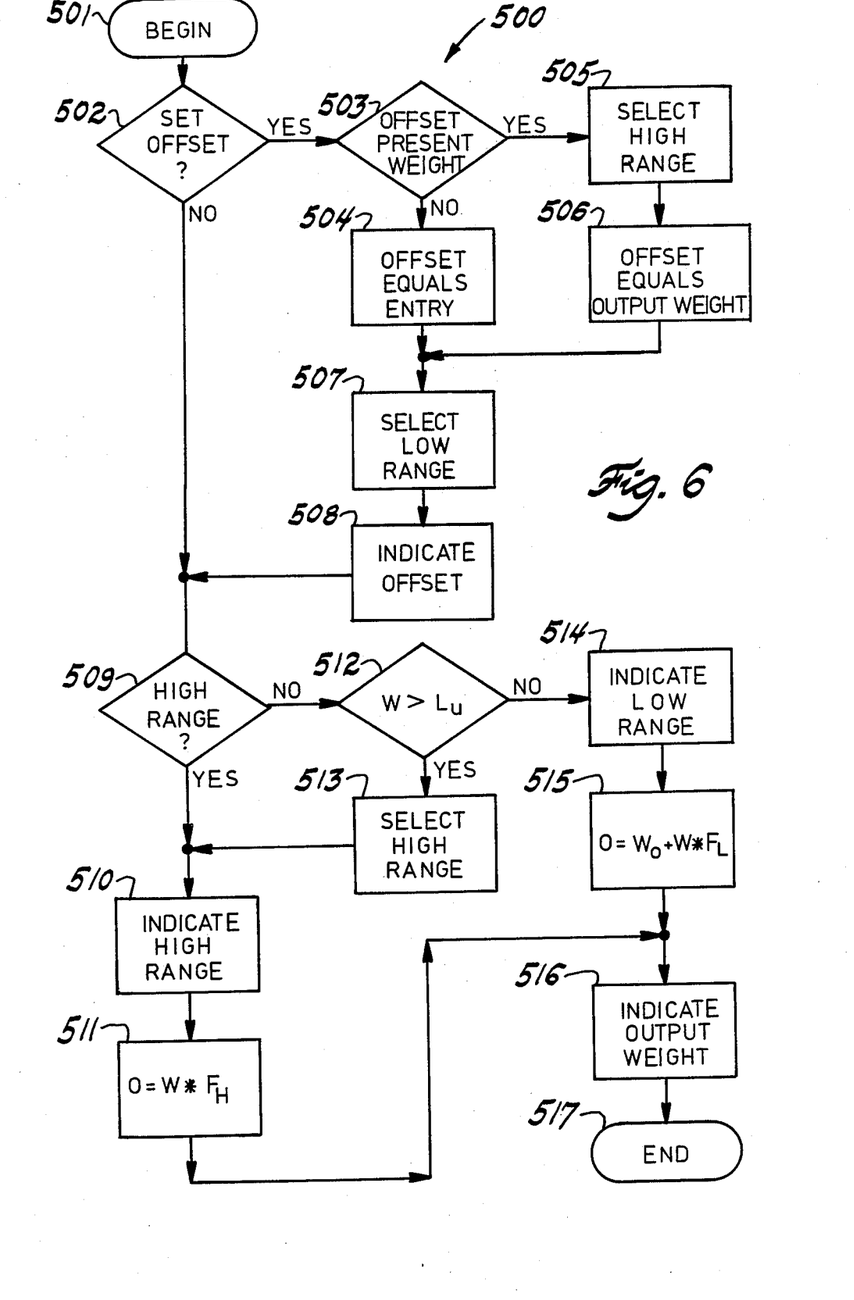
FIG. 6 illustrates a subroutine suitable for execution by the microprocessor illustrated in FIG. 5.

FIG. 6 illustrates subroutine 600 suitable for controlling some of the operations of microprocessor 155 illustrated in FIG. 5. In accordance with this alternative embodiment of the present invention, subroutine 500 controls the functions for setting the offset and for computation of the output weight signal by microprocessor 155. As discussed above in relationship to FIG. 3, the subroutine 500 illustrated in FIG. 6 is not intended to illustrate all of the operations necessary for the electronic weigh scale 103. Instead, subroutine 500 shows some of the operations necessary relating to the control of the range and the calculation of the output weight. Those skilled in the art of programming microprocessor devices would be able to write the exact details of the program for control of such a microprocessor from the flow chart illustrated in FIG. 6 once the selection of the particular microprocessor to be employed and its corresponding instruction set are made.

Subroutine 500 is begun via begin block 501. Subroutine 500 first tests whether or not the user has requested to set the offset for the beginning of the most sensitive weigh scale (decision block 502). Such an offset selection would be made via manipulation of particular keys within keyboard 170 which is communicated to microprocessor 155 via the key input. If such an offset selection has been made, then subroutine 500 enters a series of steps to process this selection. In the event that such an offset selection is not made, then control of subroutine 500 passes directly to decision block 509.

In the case in which an offset selection has been made, then subroutine 500 tests to determine whether or not this offset is selected as the present weight (decision block 503). In accordance with the preferred embodiment of the present invention, the offset selection can be made either at the present weight on the scale or at a weight which is entered via digits in the keyboard 170. In the event that the offset is not set at the present weight, then the offset is set at a particular weight which is entered via keyboard 170. In such an event, subroutine 500 sets the offset equal to the weight entry made via keyboard 170 (processing block 504).

If the offset has been selected as the present weight, then subroutine 500 selects the high range (processing block 505). This selection is made via the select output of microprocessor 155 causing selection switch 130 to apply the output of first amplifier 127 to analog to digital converter 140. Subroutine 500 then causes microprocessor 155 to calculate the output weight and to set the offset equal to this output weight (processing block 506). In accordance with this invention, the output weight is a predetermined multiple of the digital signal received at the weight input. In either case, this offset is stored for later computation of the output weight on the most sensitive scale.

Regardless of the manner in which the offset is entered, subroutine 500 selects the low range (processing block 507) and generates an indication of this offset (processing block 508). Selection of the lower range takes place every time an offset is selected because it is believed that the user desires to weigh an object which has a weight within the most sensitive scale as adjusted by this offset. The indication of the offset is made via display 160 by generation of an appropriate display signal. This serves to indicate to the user the beginning weight of the most sensitive scale. Control of subroutine 500 next passes to decision block 509 as in the case in which the offset has not been set.

Subroutine 500 next tests to determine whether or not the electronic weigh scale 103 is in the high range (decision block 509). In the event that the electronic weigh scale 103 is in the higher range, then this high range is indicated (processing block 510). This indication of the weight range is made via display 160 in the same manner as indication of the weight range in accordance with the embodiments illustrated in FIGS. 1 to 3. Typically, display 160 will include one segment indicating the high range and one segment indicating the low range, the particular segment actuated corresponding to the particular range.

Subroutine 500 then computes the output weight (processing block 511). This computation takes place similar to that previously described above in relation to processing block 311 of FIG. 3. This computation takes place as follows:

$$O = W * F_H$$

where O is the output weight to be computed, W is the digital weight signal received from analog to digital converter 140 and $F_H$ is the scaling factor for the high range which is proportional to the gain of first amplifier 127.

In the event that the electronic weigh scale 103 is not in the high range, then it must be in the low range. Subroutine 500 then tests to determine whether or not the digital weight signal W is greater than an upper limit signal $L_U$ (decision block 512). This determines whether or not the weight is within the range of the most sensitive scale. If the digital weight signal W is not within this range, then the high range is selected (processing block 513). This selection is made by generation of the appropriate signal at the select output to cause selection switch 130 to couple the output of first amplifier 125 to the input of analog to digital converter 140. Control of subroutine 500 proceeds to decision block 510, in the same manner in which the high range had been initially selected. The selection of the high range takes place whenever it is determined that the weight to be measured falls outside the low range even when the offset is taken into account.

In the event that the digital weight signal W is within the range of the most sensitive weight range, then this most sensitive weight range is indicated (processing block 514). Next, the output weight signal is computed (processing block 515). This computation takes place as follows:

$$O = W_O + W * F_L$$

where O is the output weight to be computed, $W_O$ is a weight corresponding to the offset, W is the digital weight signal received from analog to digital converter 140 and $F_L$ is a factor of proportionality related to the total gain from first amplifier 127 and differential amplifier 129.

Regardless of the particular range selected or the manner of computing the output weight, this output weight is then indicated (processing block 516). Subroutine 500 is now complete and is exited via end block 517.

Figure 7:
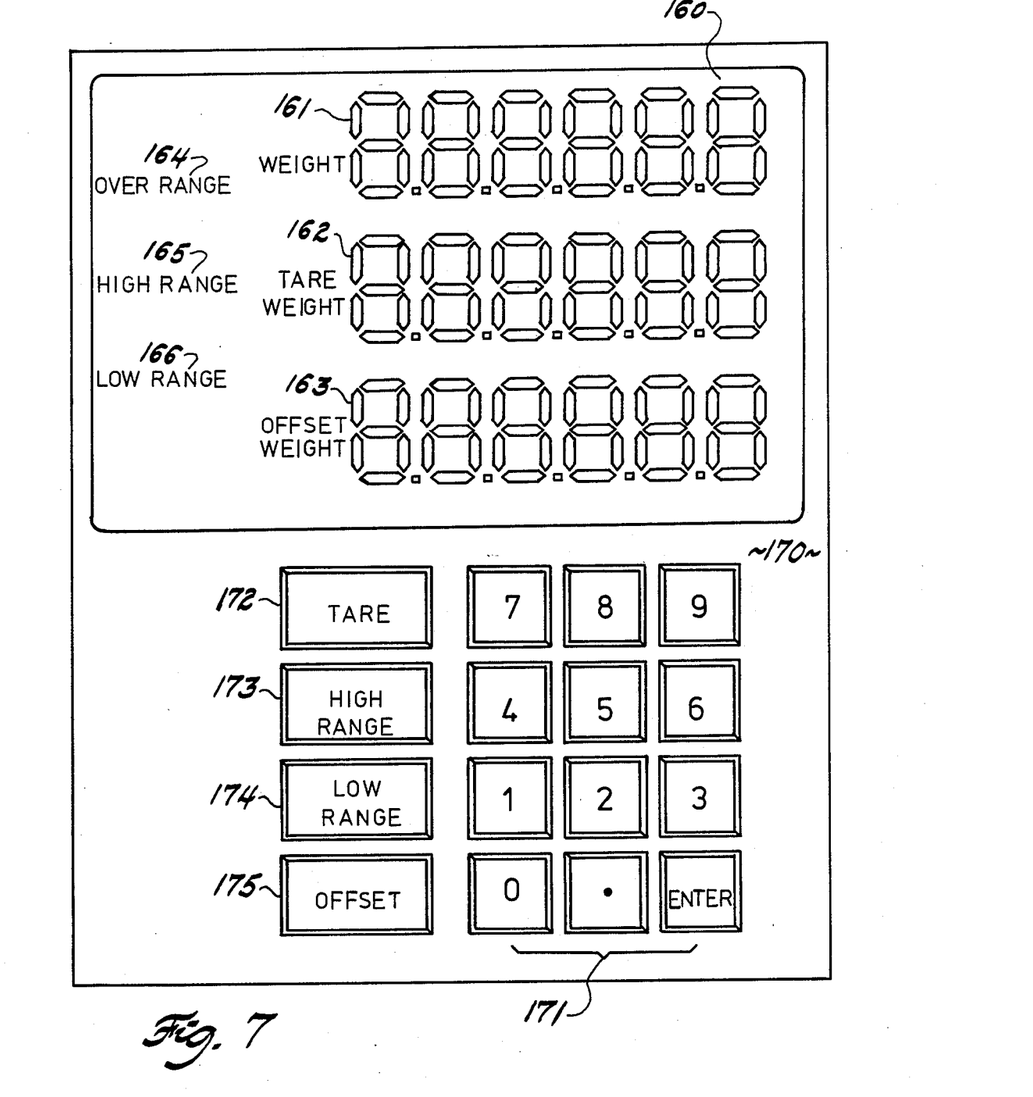
FIG. 7 illustrates an example of the user interface of the electronic weigh scale including display 160 and keyboard 170.

FIG. 7 illustrates an example of the user interface of the electronic weigh scale of the present invention showing display 160 and keyboard 170. Display 160 is illustrated as including three multidigit displays. Weight display 161, tare weight display 162 and offset weight display 163 are illustrated as including six seven segment digits, each digit also including a decimal point. In a manner known in the art, selected segments of the digits and one of the decimal points are actuated to indicate the desired number. Display 160 also includes overrange indicator 164, high range indicator 165 and low range indicator 166. These indicators are selectively actuated under the control of microprocessor 150 or 155 to indicate their respective conditions. Keyboard 170 includes a set of keys 171 for entering numbers. This set of keys 171 includes a key for each of the ten digits 0 to 9, a decimal point key and an enter key. Keyboard 170 also includes tare key 172 which enables entry of a tare weight, high range key 173 which selects the high range weight scale, low range key 174 which selects the low range weight scale, and offset key 175 which enables the entry of an offset weight as previously described.

I claim:

1. A multiple range electronic weigh scale comprising:
   a load cell for generating an electrical analog weight signal proportional to the weight of an object to be weighed;
   a selectable gain amplifier connected to said load cell for amplifying said weight signal by an amplification factor corresponding to a selected one of a set of predetermined gains;
   an analog to digital conversion means connected to said selectable gain amplifier means for generating a digital weight corresponding to said amplified analog weight signal;
   a microscope connected to said selectable gain amplifier means and said analog to digital conversion means for
       comparing said digital weight signal to an upper limit digital value and to a lower limit digital value less than said upper limit digital value,
       generating an output gain selection signal for controlling selectable gain amplifier means to select the next lower gain of said set of predetermined gains if said digital weight signal is greater than said upper limit digital value,
       generating an output gain selection signal for controlling said selectable gain amplifier means to select the next higher gain of said set of predetermined gains if said digital weight signal is less than said lower limit digital value, and
       generating an output weight signal corresponding to said digital weight signal and said output gain selection signal,
   generating an overrange signal if said digital weight signal is greater than said upper digital limit value of said output gain selection signal controls said selectable gain amplifier to select the lowest gain of said set of predetermined gains; and
   a display device connected to said microprocessor for generating a visually perceivable indication of said output weight signal in the form of a plurality of digits and for generating a visually perceivable overrange indication upon generation of said overrange signal.

2. The multiple range electronic weigh sale as claimed in claim 1, further comprising:
   an input device connected to said microprocessor for receiving operator inputs; and
   wherein said microprocessor further includes means for specifying one of said upper limit digital value and said lower limit digital value corresponding to said operator inputs.

3. The multiple range electronic weigh scale as claimed in claim 1, further comprising:
   an input device connected to said microprocessor for receiving operator inputs; and
   wherein said microprocessor further includes means for specifying said upper limit digital value corresponding to said operator inputs.

4. The multiple range electronic weigh scale as claimed in claim 6, wherein:
   said microprocessor further includes means for causing said display device to generate an error signal if said upper limit digital value specified by said operator inputs is not greater than said lower limit digital value or if said upper limit digital value specified by said operator inputs is greater than a predetermined maximum upper limit digital value corresponding to the maximum capacity of said analog to digital converter.

5. A multiple range electronic weigh scale comprising:
   a load cell for generating an electrical weight signal proportional to the weight of an object to be weighed;
   a high range amplifier means connected to said load cell for amplifying said weight signal by an amplification factor corresponding to a first predetermined gain;
   a low range amplifier means connected to said load cell having an offset weight input for amplifying the difference between said weight signal and the signal received at said offset weight input by an amplification factor corresponding to a second predetermined gain greater than said first predetermined gain;
   a selection means connected to said high range amplifier and said low range amplifier means and having a selection output for selectively coupling said amplified weight signal from said high range amplifier or said amplifier weight signal from said low range amplifier to said selection output;
   an offset weight signal generating means connected to said offset weight input of said low range amplifier means for generating an operator selectable offset weight signal for amplification to said offset weight input of said low range amplifier means;
   a range selector means connected to said selection means for controlling said selection means to couple the amplified weight signal of a selected one of said high range amplifier means and said low range amplifier means; and an output device connected to said offset weight signal generating means and said range selector means for generating an operator perceivable indication of weight proportional to said amplified weight signal if said high range amplifier means is selected and proportional to the sum of a weight corresponding to said offset weight signal and said amplified weight signal if said low range amplifier means is selected.

6. The multiple range electronic weigh scale as claimed in claim 5, wherein:
   said multiple range electronic weigh scale further includes a current weight offset manual input means connected to said offset weight signal generating means; and
   wherein said upper range selector means is further connected to said offset weight signal generating means and further includes means for controlling said selection means to select said amplified weight signal from said high range amplifier means, then control said offset weight signal generating means to generate said offset weight signal corresponding to said amplified weight signal from said high range amplifier means, and thereafter controlling said selection means to select said low range amplified weight signal upon receipt of said current weight offset manual input, thereby enabling operator selection of said offset weight signal equal to the current weight indicated by said output device upon receipt of said current weight offset manual input.

7. The multiple range electronic weigh scale as claimed in claim 5, wherein:
   said output device further includes means for generating an operator perceivable indication of said weight corresponding to said offset weight signal.

8. A multiple range electronic weigh scale comprising:
   a load cell for generating an electronic analog weight signal proportional to the weight of an object to be weighed;
   a first amplifier means connected to said load cell for amplifying said analog weight signal by a first predetermined gain, thereby producing a first amplified analog weight signal;
   a second amplifier means connected to said first amplifier means and having an offset weight input for amplifying the difference between said first amplified analog weight signal and the signal received at said offset weight input by a second predetermined gain, thereby producing a second amplified analog weight signal;
   a switch means connected to said first and second amplifier means for outputting a selected one of said first and second amplified analog weight signals;
   an analog to digital conversion means connected to said switch means for generating a digital weight signal corresponding to said selected one of said first and second amplified analog weight signals;
   a microprocessor connected to said switch means and said analog to digital conversion means for
      generating a switch selection signal for controlling said switch means to select one of said first and second amplified analog weight signal,
      generating an operator selectable digital offset signal, and
      generating an output weight signal proportional to said digital weight signal if said switch selection signal selects said first amplified analog signal and proportional to the sum of a weight corresponding to said digital offset signal and said digital weight signal if said switch selection signal selects said second amplified analog signal;
   a digital to analog conversion means connected to said offset weight input of said second amplifier means and said microprocessor for generating an analog offset weight signal corresponding to said digital offset signal and supplying said analog offset weight signal to said offset weight input of said second amplifier means; and
   a display device connected to said microprocessor for generating a visually perceivable indication of said output weight signal in the form of a plurality of digits.

9. The multiple range electronic weigh scale as claimed in claim 8, wherein:
   said multiple range electronic weigh scale further includes a current weight offset manual input means connected to said microprocessor; and
   wherein said microprocessor further includes means for generating said switch selection signal to select said first amplified signal, then generating said digital offset signal corresponding to said output weight signal, and thereafter generating said switch selection signal to select said second amplified analog weight signal upon receipt of said current weight offset manual input, thereby enabling operator selection of said offset weight signal equal to said output weight signal upon receipt of said current weight offset manual input.

10. The multiple range electronic weigh scale as claimed in claim 8, wherein:
    said display device further includes means for generating a visually perceivable indication of said weight corresponding to said digital offset signal.

11. The multiple range electronic weigh scale as claimed in claim 8, wherein:
    said multiple range electronic weigh scale further includes a keyboard input means connected to said microprocessor for entry of numeric digits; and
    wherein said microprocessor further includes means for generating said digital offset signal corresponding to numeric digits entered via said keyboard means.

* * * * *